(12) United States Patent
Rao et al.

(10) Patent No.: US 6,827,924 B2
(45) Date of Patent: Dec. 7, 2004

(54) PROCESS FOR THE PREPARATION OF NANOCRYSTALLINE ZEOLITE BETA

(75) Inventors: Kottapalli Koteswara Rao, Andhra Pradeah (IN); Bhavnari Puma Chandra Rao, Andhra Pradeah (IN); Boyapati Manoranjan Choudary, Andhra Pradeah (IN); Lakshmi Kantam Mannepalli, Andhra Pradeah (IN); Vijaya Raghavan Kondapuram, Andhra Pradeah (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/306,744

(22) Filed: Nov. 29, 2002

(65) Prior Publication Data

US 2004/0105814 A1 Jun. 3, 2004

(51) Int. Cl.$^7$ .............................. C01B 39/04
(52) U.S. Cl. ................ 423/705; 423/707; 423/711; 423/716; 423/DIG. 27
(58) Field of Search ................ 423/705, 707, 423/710, 711, 716, DIG. 27

(56) References Cited

U.S. PATENT DOCUMENTS 5,474,754 A * 12/1995 Saxton et al. ............... 423/705
5,683,673 A   11/1997 Buskens et al.
6,294,150 B2 * 9/2001 Takahashi et al. .......... 423/716

FOREIGN PATENT DOCUMENTS

| EP | 609304 B | * | 8/1997 |
| EP | 1323705 A1 | | 7/2003 |
| ES | 2142142 | | 1/1999 |

OTHER PUBLICATIONS

Smith et al, "A Novel Method for the Nitration of Simple Aromatic Compounds", Journal of Oganic Chemistry, American Chemical Society, Easton, US, vol. 63, No. 23, Nov. 13, 1998, pp. 8448–8454, XP000783413.

Guo et al, Convenient Synthesis of Zeolite Beta in Basic Media Without Alkali Metal Cations, Chemistry Letters, No. 5, May 2002, pp. 532–533.

Camblor et al, "Synthesis of Nanocrystalline Zeolite Beta in the Absence of Alkali Metal Cations", Progress in Zeolite and Microporous Materials, Studies in Surface Science and Catalysis, vol. 105, 1997, pp. 341–348, XP009013288.

* cited by examiner

*Primary Examiner*—David Sample
(74) *Attorney, Agent, or Firm*—Nixon & Vanderhye P.C.

(57) ABSTRACT

The present invention relates to the preparation of nanocrystalline zeolite beta by a modified aerogel protocol comprising four steps, namely, hydrolysis, nucleation, crystallization and supercritcal drying.

32 Claims, No Drawings

PROCESS FOR THE PREPARATION OF NANOCRYSTALLINE ZEOLITE BETA

FIELD OF THE INVENTION

The present invention relates to a process for the preparation of nanocrystalline zeolite beta More particularly, this invention relates to the preparation of nanocrystalline zeolite beta by a modified aerogel protocol comprising four steps, namely, hydrolysis, nucleation, crystallization and supercritical drying. This improved process gives excellent yields of nanocrystalline zeolite beta with a crystallite size in the range of 10 to 80 nanometer and a broad range of silica to alumina ratio 15 to 200 which shows enhanced activity for nitration of o-xylene to produce 4-nitro o-xylene with higher selectivity.

BACKGROUND OF THE INVENTION

Research has been focused recently on the development of new methods for preparation of zeolites to obtain nanometer size of zeolite crystals. This may be achieved by decreasing the nucleation temperatures, lowering the crystallization times, optimized pH conditions and also in absence of alkali metal cations during the synthesis of zeolites. Zeolite beta, having a three-dimensional large-pore system of a 12-membered ring opening 0.76 nm wide, first described in 1967 in an U.S. Patent, draws much attention because of its unique characteristics, in particular its acidity and potential for acid catalysis. The nanocrystalline zeolite beta offers several advantages over microcrystalline zeolite beta in terms of activity and selectivity due to increased active acidic sites and three dimensional interface with the support and reactant.

Reference is made to U.S. Pat. No. 3,308,069, wherein zeolite beta was described for the first time with a silica-to-alumina ratio from 10 to 150 with crystal size ranging from 0.01 to 0.05 microns in presence of alkali metal cations. The drawbacks are longer crystallization times and also the presence of alkali metal cations makes the zeolite beta inactive acidic catalyst. Reference is also made to Joaquin Perez-Pariente et al, *Applied Catalysis*, 31,1987,35–64 wherein zeolite beta was synthesized from tetraethylorthosilicate, sodium aluminate, tetraethylammonium hydroxide, sodium and potassium hydroxide. They studied the influence of alkali metal cations on the crystallization mechanism. The drawbacks are the presence of alkali metal cations in the synthetic mixture needs longer post-calcination treatment and zeolite prepared is not an acidic catalyst. Larger crystallites form due to longer crystallization times and separation of zeolite crystals require higher centrifugal forces.

Reference is made to Camblor et al, *Zeolites*, 1991, 202 and 792, wherein zeolite beta was synthesized in 30 hours at 135° C. using amorphous silica, a 40% aqueous solution of tetraethylammonium hydroxide, sodium aluminate, aluminum, sodium hydroxide, potassium hydroxide and suggested that the presence of alkali metal cations is essential for the formation of the zeolite. The disadvantages are the presence of alkali metal cations in the synthetic mixture, formation of larger crystallites and further separation of zeolite crystals requires higher centrifugal forces. Reference is also made to U.S. Pat. No. 5,427,765 wherein zeolite beta is synthesized from a mixture of tetraethylammonium hydroxide, an alkali metal silicate and an aqueous solution containing aluminum. The disadvantages is the presence of alkali metal cations in the synthesis mixture and longer crystallization times required even to form larger crystallites.

Reference is made to U.S. Pat. No. 4,923,690 wherein synthesis of highly silicious zeolite beta was described with silica-to-alumina ratio within the range of 20–1000. The drawbacks are to achieve the high silica to alumina ratio, the zeolite has to be partially crystallized. As the zeolite becomes more crystalline, the silica-to-alumina ratio decreases. In this procedure highly silicious zeolite beta was obtained with only 30 to 50% crystallinity.

Reference is made to U.S. Pat. No. 5,989,518 wherein a continuous process was developed to synthesize various molecular sieves, which control both the particle size and particle size distribution. This process involves continuously adding reactive sources of the desired components along with a structure-directing agent into a continuous crystallization reactor. Either interstage backmixing is introduced or the number of stages is adjusted in order to control particle size The disadvantages are the presence of alkali metal cations and the crystallites obtained are in the range of 3 to 20 microns. Reference is also made to U.S. Pat. No. 5,683,673 wherein zeolite beta is synthesized in presence of ethanol. Ethene is evolved during crystallization period for which the pressure developed autogeneously to 50 bar at the end of crystallization. The drawbacks are the longer crystallization times 11 days at 140° C., and separation of zeolite crystals from mother liquor requires higher centrifugation forces of up to 13,000 rpm. Reference is made to M. A. Camblor et al, *Studies in Surface Science and Catalysis*, Volume 105, 341,1997, wherein nanocrystalline zeolite beta was synthesized with crystallite size 10 to 100 nm in the absence of alkali metal cations by using colloidal silica and aluminium metal powder. The disadvantages are this method requires longer crystallization times and the separation of zeolite crystals from the mother liquor require higher centrifugation forces of up to 16,000 rpm. Reference is made to P. R. Hari Prasada Rao et al, *Chemical Communications* 1441, 1996 wherein zeolite beta was synthesized by dry gel conversion technique. The drawbacks are this process involves the presence of alkali metal cations in the synthetic mixture, and zeolite prepared will not be an acidic catalyst, longer crystallization times 3–6 days.

OBJECTS OF THE INVENTION

The main object of the present invention is to provide an improved process for the preparation of nanocrystalline zeolite beta by a modified aerogel protocol.

It is another object of the invention to provide a process for the preparation of nanocrystalline zeolite beta with a particle size of in the range of 10 to 80 nanometers with Si:Al molar ratio from 15 to 200 wherein the synthetic mixture is free from alkali metal cations.

It is yet another object of the invention to provide a process for the preparation of nanocrystalline zeolite beta where the crystallization times are low and the nanocrystalline zeolite beta is produced in high yield, is highly crystalline and shows the typical beta zeolite IR absorption bands at 575 and 525 $cm.^{-1}$ and X-ray diffraction spectrum.

SUMMARY OF INVENTION

The novelty of present invention is the preparation of nanocrystalline zeolite beta with the crystallite size in the range of 10 to 80 nanometers and in a broad range of silica to alumina ratio 15 to 200 by a modified aerogel protocol. Most of the previously proposed methods for the preparation of zeolite beta have employed synthetic mixtures containing alkali metal cations and suggested that the presence of alkali metal cations is essential for the formation of the zeolite.

Hence the preparation of zeolite beta in absence of alkali metal cations with small crystallite sizes is an exciting process. Controlled hydrolysis of the synthetic mixture, aging at room temperature, reducing the crystallization time and also subjecting the crystalline gel to supercritical drying conditions are novel ideas followed to get nanocrystalline zeolite beta in high yield. The obtained nanocrystalline zeolite beta offers several advantages over microcrystalline zeolite beta in terms of activity and selectivity due to increased active acidic sites and three dimensional interface with reactants for example 4-nitro o-xylene is obtained with higher selectivity in the range of 65–75% from nitration of o-xylene.

Accordingly, the present invention provides a process for the preparation of nanocrystalline zeolite beta comprising hydrolysing a silica source and an aluminium source in the presence of a templating agent and in absence of alkali metal cations, nucleating the resulting product under stirring at room temperature followed by crystallization at higher temperatures and pressures and finally drying the resulting product at supercritical conditions to obtaine nanocrystalline zeolite beta.

In one embodiment of the invention, the nanocrystalline zeolite beta obtained has a crystallite size in the range of 10 to 80 nanometers and a silica to alumina ratio of 15 to 200.

In another embodiment of the invention, the silica source comprises tetraethylorthosilicate (TEOS).

In a further embodiment of the invention the tetraethylorthosilicate is substantially alkali metal free.

In yet another embodiment of the invention, the aluminium source comprises aluminum nitrate.

In yet another embodiment of the invention, the templating agent used comprises aqueous tetraethyl ammonium hydroxide.

In still another embodiment of invention the oxide molar composition is $Al_2O_3$:x $SiO_2$:(0.26x+1) $TEA_2O$ :15x $H_2O$ where x varies between 400 and 14.

In another embodiment of the invention, controlled hydrolysis is effected by the slow addition of aqueous tetraethylammonium hydroxide at room temperature under stirring for 0.25–1.30 hrs In another embodiment of the invention, the synthetic reactant mixture is aged at room temperature under stirring for a period of 18–48 hrs In still another embodiment of invention the synthetic mixture is crystallized after addition of hydrocarbon-alcohol mixture in a range of 5:1 to 1:5 moles per mole of $SiO_2$.

In still another embodiment of invention the hydrocarbons-alcohols used for crystallization are selected from the group consisting of hexane, toluene, xylene, methanol, ethanol, butanol and any mixture thereof.

In still another embodiment of invention the crystallization is carried out at a temperature in the range of 120° C. to 290° C.

In still another embodiment of invention the crystallization is carried out under total pressure of 10 to 100 bar.

In still another embodiment of invention the crystallization is carried out for a period in the range of 1 hour to 5 days.

In still another embodiment of invention, the solvent mixture is vented out at supercritical conditions to obtain a free flow of nanocrystalline zeolite beta.

In still another embodiment of invention, the obtained zeolite beta is calcined in air at 200° C. to 600° C. for 1 to 24 hours.

In still another embodiment of invention the nanocrystalline zeolite beta shows enhanced activity for nitration of o-xylene to produce 4-nitro o-xylene with higher selectivity in the range of 65–75%.

The present invention also relates to the use of a nanocrystalline zeolite beta obtained by hydrolysing a silica source and an aluminium source in the presence of a templating agent and in absence of alkali metal cations, nucleating the resulting product under stirring at room temperature followed by crystallization at higher temperatures and pressures and finally drying the resulting product at supercritical conditions to obtaine nanocrystalline zeolite beta for production of 4-nitro o-xylene with high selectivity.

DETAILED DESCRIPTION OF INVENTION

The present invention provides an improved process for the preparation of nanocrystalline zeolite beta with a crystallite size in the range of 10 to 80 nanometers in a broad range of silica to alumina ratios 15 to 200 The protocol observed is a modified aerogel protocol comprising of essentially four steps, namely, hydrolysis, nucleation crystallization and drying. The product zeolite beta obtained shows enhanced activity for nitration of o-xylene to produce 4-nitro o-xylene with higher selectivity in the range of 65–75% The product nanocrystalline zeolite beta obtained has oxide molar composition of $Al_2O_3$:x $SiO2$: (0.26x+1) $TEA_2O$:15x $H_2O$, varied between 400 and 14.

The synthetic reaction mixture contains tetraethylorthosilicate as silica source, aluminium nitrate as aluminium source and aqueous tetraethylammonium hydroxide as templating agent. The reaction is carried out by controlled hydrolysis with the slow addition of aqueous tetraethylammonium hydroxide at 25° C. under stirring for 0.25–1.30 hrs. the synthetic mixture is aged at room temperature under stirring for 18–48 hrs. Crystallization is preferably carried out in presence of hydrocarbon and alcohol mixture in a range of 5:1 to 1:5 moles per mole of $SiO_2$. The hydrocarbons-alcohols selected for crystallization are hexane, toluene, xylene, methanol, ethanol, butanol etc. Nanocrystalline zeolite beta is obtained at super critical drying conditions.

The crystallization treatment is carried out at a temperature within the range of 120° C. to 280° C., under total pressure of 10 to 100 bar and for a time period of from 1 hour to 5 days. The solvent mixture is then preferably vented out at supercritical conditions to obtain a free flow of nanocrystalline zeolite beta. Obtained zeolite beta may be calcined in air at 200° C. to 600° C., for 1 to 24 hours. The nanocrystalline zeolite beta obtained is useful in production of 4-nitro o-xylene with higher selectivity in the range of 65–75% by the nitration of o-xylene.

The following examples are given by way illustration of the present invention and therefore should not be constructed to limit the scope of the present invention.

EXAMPLE 1

Nanocrystalline zeolite beta was synthesized as follows:

A solution containing 2.5 gms of aluminum nitrate in 30.82 gms of 25% aqueous solution of tetraethylammonium hydroxide was added in drop wise to 20.8 gms of tetraethylorthosilicate under stirring at room temperature for 30 min to form a gel. The hydrolysed gel was heated on a water bath at 50° C. to evaporate the ethanol formed during hydrolysis and a precipitate was formed. This precipitate was dissolved into a thick solution within a half-hour time which was then stirred at room temperature for 24 hours. Crystallization of the thick solution was carried out in stainless steel autoclave for 24 h at 130° C. to obtain white colloidal suspension. To this white colloidal suspension, methanol and toluene were added in 1:1 ratio (200 ml) and this solution was heated to 265° C. by raising the temperature through 1° C./min and held at this temperature for 10 min. Vented the solvent vapour at this temperature within one minute. The recovered See flow nanocrystalline zeolite beta was dried in oven at 120° C. for 12 hrs and calcined in air at 600° C. for 6 hrs to remove organic template molecules. The yield, expressed as the weight of solids after calcination as a proportion of the total of $SiO_2$ and $Al_2O_3$ in the gel, was 89%

The nanocrystalline zeolite beta produced is highly crystalline and shows the typical beta zeolite X-ray diffraction spectrum and IR absorption bands at 575 and 525 cm.$^{-1}$. The surface area of the nanocrystalline zeolite beta is 583 m$^2$/g determined by the BET equation The crystallite size was calculated by using Transmission electron microscope and is less than 80 nanometers.

EXAMPLE 2

In a typical reaction, 1.06 gms of o-xylene and 0.1 gm of the catalyst were taken in to a 50-ml two-necked round-bottomed flask along with 6 ml of dichloroethane as the solvent. The resulting mixture was heated to 90° C. and when the steady state is acquired, 1.06 gms of nitric acid (70%) was slowly added for 1 h and continued the reaction for 3 hrs. A reverse Dean-Stark apparatus was used to separate water formed during the reaction. After completion of the reaction, the reaction mixture was filtered and the filtrate was subjected to base wash to remove the excess acid. The conversion is calculated based on GC analysis by using normalization method. The isomers formed were confirmed by GC-MS.

| Conversion (%) | 48.00 |
|---|---|
| Selectivity (%) | |
| 4-nitro o-xylene | 68.00 |
| 3-nitro o-xylene | 32.00 |

The Main Advantages of the Present Invention are
1. A nanocrystalline zeolite beta crystallite size in the range of 10 to 80 nanometers with Si: Al molar ratio from 15 to 200 was synthesized
2. The synthetic mixture is free from alkali metal cations.
3. The crystallization times are very low compared to the conventional procedure.
4. The nanocrystalline zeolite beta was produced in high yield.
5. The nanocrystalline zeolite beta produced is highly crystalline and shows the typical beta zeolite IR absorption bands at 575 and 525 cm.$^{-1}$ and X-ray diffraction spectrum.
6. The nanocrystalline zeolite beta shows enhanced activity for nitration of o-xylene to produce 4-nitro o-xylene with higher selectivity which is an important raw material of synthetic Vitamin B2 and many dyes and other chemicals.

We claim:
1. A process for preparing nanocrystalline zeolite beta comprising hydrolyzing a synthetic mixture comprising a silica source and an aluminium source in the presence of a templating agent, and in the absence of alkali metal cations, nucleating the resulting product under stirring at room temperature followed by crystallization at higher temperatures and pressures and finally drying the resulting product at supercritical conditions to obtain nanocrystalline zeolite beta.

2. A process as claimed in claim 1 wherein the nanocrystalline zeolite beta obtained has a crystallite size in the range of 10 to 80 nanometers and a silica to alumina ratio of 15 to 200.

3. A process as claimed in claim 1 wherein the silica source comprises tetraethylorthosilicate.

4. A process as claimed in claim 3 wherein the tetraethylorthosilicate is substantially alkali metal free.

5. A process as claimed in claim 1 wherein the aluminium source comprises aluminum nitrate.

6. A process as claimed in claim 1 wherein the templating agent used comprises aqueous tetraethyl ammonium hydroxide.

7. A process as claimed in claim 1 wherein the oxide molar composition in the synthetic reactant mixture is $Al_2O_3$:x $SiO_2$:(0.26x+1) $TEA_2O$:15x$H_2O$ where x varies between 400 and 14.

8. A process as claimed in claim 1 wherein controlled hydrolysis is effected by the addition of aqueous tetraethylammonium hydroxide at room temperature under stirring for 0.25–1.30 hrs.

9. A process as claimed in claim 1 wherein the synthetic mixture is nucleated at room temperature under stirring for a period of 18–8 hrs.

10. A process as claimed in claim 1 wherein the synthetic mixture is crystallized after addition of hydrocarbon-alcohol mixture in a range of 5:1 to 1:5 moles per mole of $SiO_2$.

11. A process as claimed in claim 10 wherein the hydrocarbon-alcohol mixture used for crystallization is selected from group consisting of hexane, toluene, xylene, methanol, ethanol, butanol and any mixture thereof.

12. A process as claimed in claim 1 wherein the crystallization is carried out at a temperature in the range of 120° C. to 280° C.

13. A process as claimed in claim 1 wherein the crystallization is carried out under total pressure of 10 to 100 bar.

14. A process as claimed in claim 1 wherein the crystallization is carried out for a period in the range of 1 hour to 5 days.

15. A process as claimed in claim 10 wherein th hydrocarbon-alcohol mixture is vented out at supercritical conditions to obtain a free flow of nanocrystalline zeolite beta.

16. A process as claimed in claim 1 wherein the obtained zeolite beta is calcined in air at 200° C. to 600° C. for 1 to 24 hours.

17. A process as claimed in claim 1 wherein the nanocrystalline zeolite beta obtained shows a selectivity of 65–75% in the nitration of o-xylene to 4-nitro o-xylene.

18. A process for preparing nanocrystalline zeolite beta comprising hydrolyzing a synthetic mixture comprising a silica source and an aluminium source in the presence of a templating agent, and in absence of alkali metal cations, nucleating the resulting product under stirring at room temperature followed by crystallization at higher temperatures and pressures and finally drying the resulting product at supercritical conditions to obtain nanocrystalline zeolite beta, and wherein the silica source comprises tetraethylorthosilicate, and wherein the aluminium source comprises aluminum nitrate.

19. A process as claimed in claim 18 wherein the nanocrystalline zeolite beta obtained has a crystallite size in the range of 10 to 80 nanometers and a silica to alumina ratio of 15 to 200.

20. A process as claimed in claim 18 wherein the tetraethylorthosilicate is substantially alkali metal free.

21. A process as claimed in claim 18 wherein the templating agent used comprises aqueous tetraethyl ammonium hydroxide.

22. A process as claimed in claim 18 wherein the oxide molar composition in the synthetic reactant mixture is $Al_2O_3$:x $SiO_2$:(0.26x+1) $TEA_2O$:15x$H_2O$ where x varies between 400 and 14.

23. A process as claimed in claim 18 wherein controlled hydrolysis is effected by the addition of aqueous tetraethylammonium hydroxide at room temperature under stirring for 0.25–1.30 hrs.

24. A process as claimed in claim 18 wherein the synthetic mixture is nucleated at room temperature under stirring for a period of 18–48 hrs.

25. A process as claimed in claim 18 wherein the synthetic mixture is crystallized after addition of hydrocarbon-alcohol mixture in a range of 5:1 to 1:5 moles per mole of $SiO_2$.

26. A process as claimed in claim 25 wherein the hydrocarbon-alcohol mixture used for crystallization is selected from the group consisting of hexane, toluene, xylene, methanol, ethanol, butanol and any mixture thereof.

27. A process as claimed in claim 18 wherein the crystallization is carried out at a temperature in the range of 120° C. to 280° C.

28. A process as claimed in claim 18 wherein the crystallization is carried out under total pressure of 10 to 100 bar.

29. A process as claimed in claim 18 wherein the crystallization is carried out for a period in the range of 1 hour to 5 days.

30. A process as claimed in claim 25 wherein the hydrocarbon-alcohol mixture is vented out at supercritical conditions to obtain a free flow of nanocrystalline zeolite beta.

31. A process as claimed in claim 18 wherein the obtained zeolite beta is calcined in air at 200° C. to 600° C. for 1 to 24 hours.

32. A process as claimed in claim 18 wherein the nanocrystalline zeolite beta obtained shows a selectivity of 65–75% in the nitration of o-xylene to 4-nitro o-xylene.

* * * * *